United States Patent [19]

Horner

[11] Patent Number: 4,571,987
[45] Date of Patent: Feb. 25, 1986

[54] LEAK DETECTOR

[76] Inventor: John A. Horner, 211 E. Grove St., Kawkawlin, Mich. 48631

[21] Appl. No.: 534,310

[22] Filed: Sep. 21, 1983

[51] Int. Cl.[4] .......................................... G01F 23/14
[52] U.S. Cl. ..................................... 73/49.2; 73/292; 73/1 H
[58] Field of Search ............... 73/49.2; 302, 291, 295, 73/1 H, 292; 374/4, 142, 143, 202, 201, 190, 203, 115, 116, 55

[56] References Cited

U.S. PATENT DOCUMENTS

| | | | |
|---|---|---|---|
| 517,388 | 3/1894 | Linder | 374/202 |
| 1,598,571 | 8/1926 | Fox et al. | 73/302 |
| 1,720,159 | 7/1929 | Willmann | 73/302 |
| 2,012,511 | 8/1935 | Hubbard | 73/302 |
| 2,853,874 | 9/1958 | Mennesson | 73/40 |
| 3,580,055 | 5/1971 | White | 73/49.2 |
| 3,587,316 | 6/1971 | Kapteyn | 73/302 |
| 3,726,141 | 4/1973 | Bremer | 374/202 |
| 3,961,532 | 6/1976 | Kukuruzinski | 374/190 |
| 4,006,636 | 2/1977 | Holmen | 73/302 |
| 4,108,002 | 8/1978 | Rowe et al. | 374/190 |
| 4,186,591 | 2/1980 | Mooney | 73/49.2 |
| 4,362,403 | 12/1982 | Mooney | 374/4 |
| 4,472,969 | 9/1974 | Templin | 73/292 |

FOREIGN PATENT DOCUMENTS

| | | | |
|---|---|---|---|
| 2835036 | 2/1980 | Fed. Rep. of Germany | 73/292 |
| 338529 | 3/1929 | United Kingdom | 73/302 |

Primary Examiner—S. Clement Swisher
Assistant Examiner—Hezron E. Williams
Attorney, Agent, or Firm—Fisher, Crampton, Groh and McGuire

[57] ABSTRACT

A method and apparatus for testing liquid storage tanks for leakage by using apparatus to measure changes in liquid level and temperature over a predetermined period of time in which the liquid level apparatus includes means for discharging a uniform low pressure to a fixed point below the liquid level in the container and measuring any change in pressures over the predetermined period of time and in which the temperature measuring apparatus includes a liquid filled probe extending for substantially the full depth of the liquid in the tank with any changes in temperature in the probe liquid resulting in an expansion or contraction of the probe liquid with such liquid expansion or contraction being visibly indicated at a sight tube.

3 Claims, 1 Drawing Figure

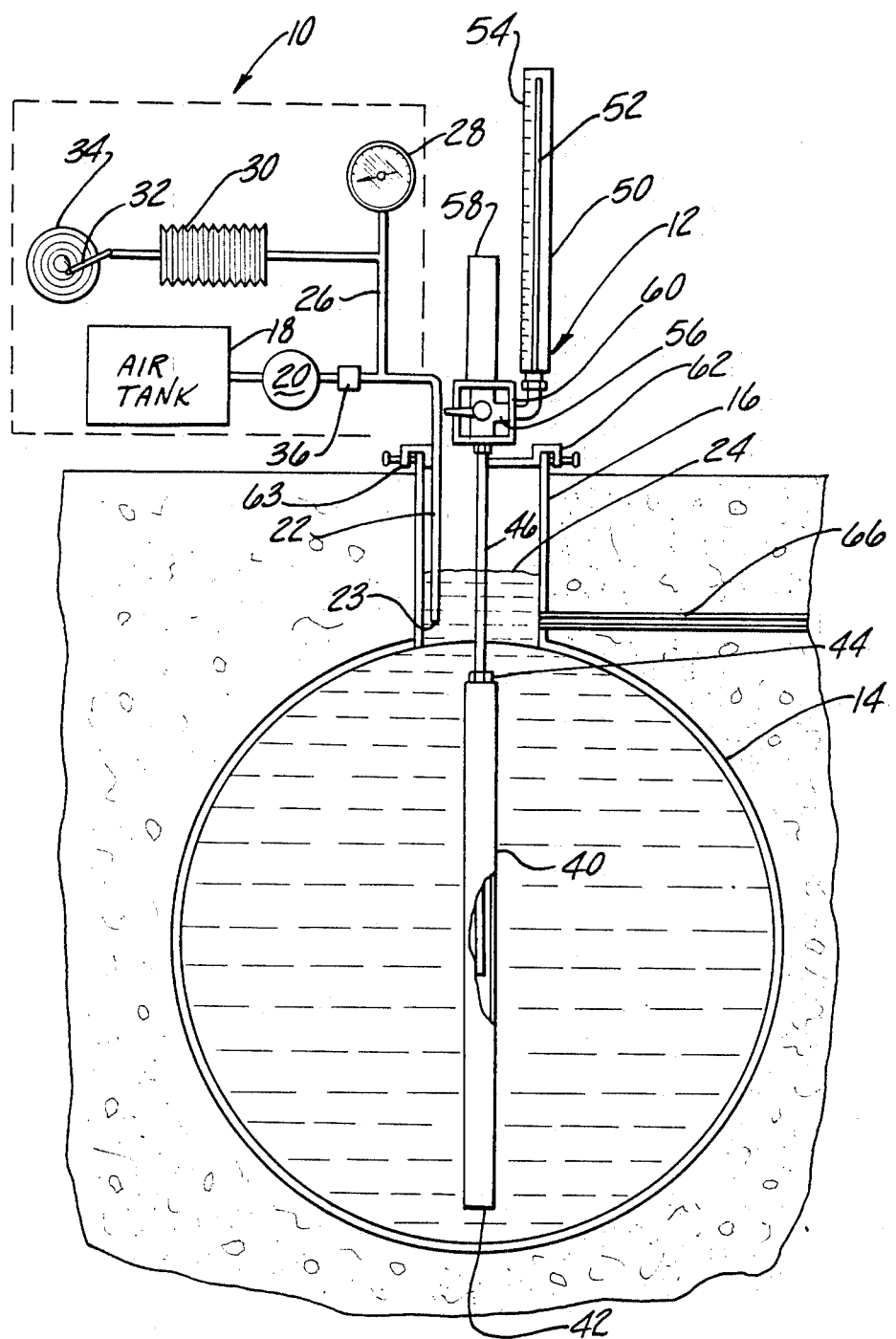

LEAK DETECTOR

This invention relates to the testing of liquid storage tanks to determine the amount of leakage from or to the tank.

It has been the practice for many years to check changes in volume of a liquid storage tank over a given period of time to determine whether liquid is leaking from or to the tank. This has been accomplished by completely filling the tank including a fill pipe and sometimes an extension of the fill pipe and measuring the change in level within the fill pipe or extension. It also has been well known that slight temperature changes effect the volume calculations or level readings and efforts have been made to obtain accurate temperature readings However, temperature in tanks holding up to 20,000 or more gallons of liquid vary at different levels and at different locations within the tank. In an effort to overcome the problems of measuring such temperature differentials, temperature has been taken at a central location on the assumption that this represents an average temperature or the liquid in the tank has been agitated in an effort to achieve a uniform temperature. In the latter case there is a requirement for pumping equipment and the test becomes time consuming and expensive.

For accurate testing it is imperative that the temperature be accurately measured and recorded. At the present time the maximum permissible leakage rate from tanks of any size is 0.05 gallons per hour. In a 10,000 gallon storage tank such a change in volume can be accomplished by a temperature change of 0.007 degrees F. From this it can be seen that the temperature must be accurately measured to within thousanths of a degree and such temperature must accurately reflect the average temperature of the liquid in the tank.

It is an object of the invention to provide an apparatus and method for accurately measuring even small changes in temperature and liquid level over a relatively short period of time from which volume changes can be calculated to determine whether leakage is occurring.

In a preferred embodiment of the invention changes in liquid level and therefore liquid volume in the container are detected by releasing a controlled air pressure at a fixed point below the level of the liquid in a fill pipe communicating with the container and measuring the pressure in the conduit releasing such air pressure. As liquid level changes the air pressure will vary and such pressure changes can be very accurately measured and recorded. Simultaneously with the measurement of liquid level, the liquid temperature is measured to permit calculation to determine whether the change in volume in a fluid container is due to leakage or to temperature change. Such temperature measurement and recording is accomplished by the use of a tubular probe which is inserted through the fill pipe and immersed in the liquid of the container to extend vertically for substantially the entire depth of the container. The probe is filled with a liquid having the same co-efficient of expansion as the liquid in the tank. After a period of time the liquid temperature in the probe will reflect the temperature within the tank. Subsequently, changes in temperature cause the liquid within the probe to expand or contract and such expansion or contraction is recorded at a calibrated and graduated capillary tube. From such information, the change in liquid level and change in temperature can be calculated and the determination made whether or not there is leakage to or from the container.

A preferred embodiment of the invention is diagrammatically illustrated in the accompanying drawing showing the apparatus embodying the invention in association with a tank being tested which is shown in cross section.

The method and apparatus of testing tanks for leakage includes means for accurately measuring liquid level designated at 10 and means for accurately measuring temperature changes designated at 12 during the period of time that changes in liquid level are being measured.

The apparatus 10 and 12 are used to indicate changes in volume of liquid within a tank system which includes a generally cylindrical tank 14. The tank 14 may be conventional underground storage tank such as used for storing fuel and may vary considerably in size, typically varying from 48 to 126 inches in diameter and containing up to 20,000 gallons in liquid or more. Such tanks often are disposed underground and are provided with one or more filler pipes 16 extending from the tank to ground level.

To determine changes of volume over a period of time it is important to measure the liquid level and simultaneously the temperature since these two factors are primarily responsible for volume changes. The apparatus 10 for measuring liquid level includes a tank of compressed air 18 which has an adjustable pressure regulator 20 communicating with conduit 22. The open end 23 of the conduit 22 is disposed at a fixed point below the liquid level indicated at 24 where the conduit 22 communicates through a branch conduit to either a pressure gauge 28 or to a bellows 30 which responds to pressure changes and moves a pen recorder 32 on a recorder disc 34 to make a continuous record of pressure changes. Changes in liquid level 24 result in changes in the pressure readings at the guage 28 or recorder 34 to indicate the magnitude of change in liquid level. To minimize air pressure fluctuations and to permit adjustment of the pressure regulator to very low pressures, the conduit 22 is provided with a fixed, restricted orifice at 36 which is of very small diameter. In actual practice, the orifice employed had a diameter of 0.004 inches. The restricted orifice permits achieving uniform low air pressures not otherwise obtainable by use of a pressure regulator alone.

The apparatus 12 by which changes in temperature are detected includes a probe 40 formed by a metal tube and having a closed end 42. The opposite end of the probe 40 is provided with a fitting 44 which slidably receives a smaller metal tube 46 a portion of which is disposed within the tubular probe 40. By way of example the tube 40 has an inside diameter of approximately 1" and the tube 46 has an inside diameter of ¼". The upper end of the tube 46 is provided with temperature indicating apparatus 50 which includes a transparent capillary or sight tube 52 mounted on a scale 54. The lower end of the capillary tube 52 is in liquid communication with a three-way valve 56. The valve 56 also communicates with a fill tube 58 and with the tube 46. The three-way valve 56 makes it possible in its first position to place the fill tube 58 in communication with both the tube 46 and capillary tube 52 or in its second position to isolate the fill tube from the capillary tube 52 and tube 46 which are in communication with each other.

During use, the temperature measuring apparatus 12 has the probe 40 and tube 46 filled with a liquid which can be the liquid being tested or a liquid having the same co-efficient of expansion as the liquid being tested. With the probe 40 and tube 46 filled with liquid and in communication with the capillary tube 52 which also contains liquid at its lower end, changes in temperature in the test liquid will result in expansion or contraction of liquid within the probe 40 which is transmitted and made apparent at the scale 54. The scale 54 itself is calibrated depending on the volume of the probe 40. By way of example it was found that an 84" long probe 40 can be calibrated to afford temperature readings of 0.02° F. per inch at the scale 54. Similarily a 48" long probe was found to calibrate at 0.03° F. per inch.

Since the scale 54 is effective to indicate minute changes in temperature, care must be exercised to minimize the effect of ambient air temperature. For this purpose, the three-way valve 56 is disposed within a box-like housing 60 which is filled with an insulating material (not shown). Also in preparation for testing, the tube 46 and the temperature indicating apparatus 50 is positioned as close as possible to the open end of the filler pipe 16 by means of a clamp arrangement 62.

Testing of containers and tanks for leakage and particularly underground tanks is initiated by completely filling the tanks to within approximately one foot of ground level and preferably well in advance of the testing. This permits the tank to become fully loaded and fully deflected due to the weight of the liquid so that deflection is not a factor in volume change during the leak testing period. Also this permits the temperature between the original liquid and the added liquid to equalize. The diameter of the tank is then established by known means such as inserting a measuring stick not shown into the fill pipe 16. The diameter of the tank will determine the length of the probe 40. In actual practice it has been found that an 84" probe and a 42" probe will accommodate tanks varying in size from 48" in diameter to 126" or more in diameter.

After the diameter of the tank is determined the probe 40 is arranged relative to the tube 46 by adjusting the fitting 44 in such a manner that the tubular probe 40 will be suspended within the liquid at equal distance from the top and bottom of the tank. By way of example with a 96" tank diameter an 84" probe would be positioned to within 6" of both the bottom and the top of the tank. Both the probe 40 and tube 46 are filled with liquid and lowered through the fill pipe 16 into the tank. The probe 40 is held in fixed position by means of the clamp 62 which holds the tubing 46 relative to the fill pipe. The temperature measuring apparatus 50 is then attached to the upper end of the ¼" tubing 46. With the handle of the three way valve 56 in the fill position, liquid being tested or other test liquids having the same coefficience of expansion are added to the fill tube 58 until liquid is apparent in the lower end of the capillary tube 52. After the probe 40 has been immersed, a period of time should be allowed for the liquid within the probe 40 to adjust to the temperature of the liquid in the tank 14. By disposing the probe vertically to extend substantially for the full depth of the liquid or the diameter of the tank, the temperature of the liquid in the tank is transmitted through the metal probe 40 to the liquid therein. After a period of equalization, any change in temperature within the liquid within the tank is transmitted to the liquid within the tube which in turn results in an expansion of or a contraction of the probe liquid and is made apparent at the sight tube 52. In this manner the vertical disposition of the tube or probe 40 serves to average the temperature differences at different levels in the tank or container being tested.

During the time that the probe 40 is adjusting to the temperature of the liquid, the conduit 22 of the liquid level apparatus 10 is disposed with its open end 23 below the liquid level 24 and is held in a fixed position by a clamp 63. The variable pressure regulator is then set to a low pressure such as 5 p.s.i. for example to permit air to escape through the open end 23 of the tube 22 below the liquid level 24. After the liquid level apparatus 10 and temperature measuring apparatus 12 are disposed in position, the three way valve 56 can be moved to the test position to place the capillary or sight tube 52 in communication with the tubular probe 40 and isolate the fill tube. Under these conditions testing and recording of data can begin.

With the valve 56 set in the test position to place the probe 40 in communication with the capillary tube 52, the temperature reading can be taken and recorded together with the time. Simultaneously, the pressure reading can be taken at the gage 28 or if a pen recorder 32 is employed, the initial reading can be noted. After the system has operated for a predetermined period of time, for example one-half of an hour, the temperature reading can again be recorded together with the pressure. At this point the liquid level apparatus 10 must be calibrated and this is accomplished by filling a container with a known volume of liquid being checked. The liquid is poured into the fill pipe 16 and the resultant increase in pressure is noted. If for example the pressure has increased a specific number of ihcrements, arithmetic calculations are made by dividing the volume of the fluid added by the number of increments to give the volume increase per pressure increment on the scale 28 or disc 34. Using the information obtained, the volume increase per pressure increment is used to calculate the volume increase over the test period using the readings on the pressure gages taken at the beginning and end of the test period.

For the same test period, the change in liquid level in the capillary tube will indicate the amount of temperature change. By way of example, with an 84 inch probe tube which was found to calibrate at 0.02 degrees per inch, a change of 0.04 inches during the test period makes it possible to convert the temperature differential to gallons of change in volume. In the example, a change of 0.4 inches would be multiplied by the factor of 0.00068 to arrive at the number of gallons. For a ten thousand gallon tank, the result would be 0.054 gallons meaning that the change in volume of the tank due to temperature increased 0.054 gallons in the test period. This result would be compared with the change in liquid level obtained by the pressure readings. If the change in volume due to temperature and the change in volume due to liquid level compare favorably, the tank would prove to be tight. If, however, there was a change in liquid level and therefore volume of the tank which cannot be accounted for by temperature change, a leak would be indicated.

If a leak is detected, an effort can be made to locate the area of the leak. To accomplish this, liquid level in the fill pipe of the tank can be lowered below the level of branch lines such as that indicated at 66. Another test can be conducted to simultaneously measure temperature and liquid level over a predetermined period of time. If the resultant calculations continue to indicate a leak, its location apparently is due to leakage from the tank itself. On the other hand, if a leak is no longer indicated, it would tend to establish that the liquid leak is in the branch piping system 66 and further efforts can be made to localize the point of leakage.

Apparatus and a method of testing liquid storage tanks for leakage has been provided in which liquid level and a liquid temperature are simultaneously measured and in which changes in liquid level and temperature are compared to determine leakage. The apparatus for measuring liquid level included an arrangement for discharging low pressure air at a fixed point below the level of liquid in a tank so that any changes in liquid level are reflected as pressure changes in the discharge tube which are measured by appropriate gages. Simultaneously, temperature changes are noted by employing a liquid filled probe extending for substantially the full depth of the liquid in the container to sense the temperatures at different levels within the liquid and to transmit such temperatures to liquid within the probe. The liquid within the probe expands or contracts in response to temperature changes and changes the level of such liquid in a capillary tube which is calibrated to reflect relative temperature readings from which calculations can be made to determine changes in volume due to temperature changes.

The embodiments of the invention in which an exclusive property or privilege is claimed are defined as follows:

1. Apparatus for testing liquid storage tanks having inlet ports for leakage comprising: a tubular probe adapted to contain a measuring liquid having a coefficient of expansion equal to the liquid in the tank being tested, means for securing said probe in a stationary vertical position relative to said inlet port and within the liquid in the tank to be tested, a graduated sight tube having liquid communication with said probe and being positioned about the level of the liquid in said tank whereby changes of liquid volume that occur in said probe in response to changes in a liquid temperature are apparent at said sight tube, a liquid chamber adjacent to said sight tube, and valve means movable between a position placing said chamber, said sight tube and said probe in communication with each other for filling with said measuring liquid and another position isolating said chamber, and means for measuring changes in liquid levels simultaneously with the measurement of changes in temperature.

2. The apparatus in claim 1 wherein said valve is insulated to minimize the effects of air temperature on the liquid temperature being tested.

3. The apparatus of claim 1 wherein said means for measuring changes in liquid levels comprises a source of air pressure, a conduit connected with said source of air pressure, means for supporting the outlet end of said conduit at a fixed point within said inlet port and beneath the upper level of the liquid in said tank, a pressure regulator to provide a constant pressure from said source to said conduit, pressure measuring means communicating with said conduit between said outlet and said pressure regulator to continuously measure changes in pressure resulting from changes in liquid level.

* * * * *